United States Patent [19]

Kitagawa et al.

[11] Patent Number: 5,086,450
[45] Date of Patent: Feb. 4, 1992

[54] EMERGENCY INTERCOMMUNICATION SYSTEM FOR ELEVATOR

[75] Inventors: Shigeo Kitagawa; Kenzo Tachino; Yasuhiro Nagata; Tomoichiro Yamamoto; Shigemi Iwata; Terumi Hirabayashi; Junichi Tanino, all of Inazawa, Japan

[73] Assignee: Mitsubishi Denki Kabushiki Kaisha, Japan

[21] Appl. No.: 568,884

[22] Filed: Aug. 17, 1990

[30] Foreign Application Priority Data

Aug. 23, 1989 [JP] Japan .................... 1-214904

[51] Int. Cl.$^5$ .......................................... H04M 11/04
[52] U.S. Cl. ........................................ 379/40; 379/45; 187/140
[58] Field of Search ................ 379/40, 41, 45, 48-51, 379/103-105, 355; 187/130, 139, 140

[56] References Cited

U.S. PATENT DOCUMENTS 3,973,648 8/1976 Hummert et al. .
4,491,198 1/1985 Noda et al. .

FOREIGN PATENT DOCUMENTS 59-94866 7/1981 Japan .
62-240278 6/1987 Japan .

Primary Examiner—James L. Dwyer
Assistant Examiner—Wing F. Chan
Attorney, Agent, or Firm—Leydig, Voit & Mayer

[57] ABSTRACT

An emergency intercommunication system for an elevator has an interphone unit and an intercommunication command switch located in an elevator car. A telephone number input apparatus for inputting the desired telephone number is provided in an elevator hall, in connection with a register apparatus for storing the input telephone number. An intercommunication command detecting section for detecting the actuation of the switch is provided in connection with an emergency call apparatus for automatically dialing the stored telephone number to connect the interphone unit with a telephone having the telephone number when the actuation of the switch is detected by the detecting apparatus. Preferably, an identification number input apparatus is provided in the elevator hall so that the register apparatus stores the telephone number only when it is input together with a predetermined identification number.

6 Claims, 3 Drawing Sheets

EMERGENCY INTERCOMMUNICATION SYSTEM FOR ELEVATOR

BACKGROUND OF THE INVENTION

1. Field of the Invention

The present invention relates to an intercommunication system for use in an emergency in an elevator in a multiple dwelling house, etc.

2. Description of the Related Art

FIG. 2 is a block diagram showing a conventional emergency intercommunication system for an elevator disclosed in, for example, Japanese Patent Laid-Open No. 240278/1987. In the conventional emergency intercommunication system, a local interphone unit 1 installed in an elevator car is connected, via an adapter 3, with a central interphone unit 2 provided in a control room of the dwelling house, the central interphone unit 2 being also connected with another central interphone unit 2a provided in a machine room. Both the local interphone unit 1 (hereinafter referred to as "the local unit") and the central interphone unit 2 (hereinafter referred to as "the central unit") are connected, via the adapter 3, with an emergency call apparatus 4 which is in turn connected, via a telephone line L, with a general control center 5 where 24-hour control of the dwelling house is performed.

The adapter 3 includes a calling operation detecting section 6 for detecting the operation of a push button (not shown) provided as a calling operation portion of the local unit 1, and a delay timer 7 electrically connected to the detecting section 6. The adapter 3 also includes a bilateral amplifier 8, a switch 9 for selectively connecting the local unit 1 with either the central unit 2 or the bilateral amplifier 8, and a relay 10 for actuating the switch 9.

When the conventional emergency intercommunication system is in its normal operation state, the switch 9 connects the local unit 1 with the central unit 2, and the bilateral amplifier 8 performs amplification only in the direction heading from the emergency call apparatus 4 to the switch 9.

Therefore, in the normal operation state of the system, when the push button of the local unit 1 is depressed, a person in the car, or the calling-out party, can intercommunicate with a person operating the central unit 2 or 2a.

On the other hand, when the calling-out party continues depressing the push button of the local unit 1 while no one is stationed in the control room because, for instance, it is nighttime, this operation of the pushing button is detected by the calling operation detecting section 6. The delay timer 7 detects that the push button is depressed over a predetermined period of time, then sends an actuation signal to the emergency call apparatus 4, thereby actuating the apparatus 4. Upon actuation, the emergency call apparatus 4 sends a circuit closing signal to the adapter 3 via a wire W5, whereby the relay 10 is operated to switch the connection at the switch 9 to the bilateral amplifier 8. This switching causes the local unit 1 to be connected with the bilateral amplifier 8, so that the calling-out party can hear a signal (a dial tone, a selection signal, or a ringing tone) transmitted from the emergency call apparatus 4 via a wire W3. At this time, the bilateral amplifier 8 is still in its unilateral state and is not able to send any audio information from the local unit 1 to the control center 5 which must receive the call from the unit 1.

Subsequently, the actuated emergency call apparatus 4 automatically dials the telephone number of the control center 5 which has previously been stored, to call the control center 5. When the call is received by the control center 5, the emergency call apparatus 4 sends a previously recorded message to the local unit 1 via the wire W3. Thereafter, the apparatus 4 sends a message completion signal to the bilateral amplifier 8 via a wire W4. Upon inputting the message completion signal, the bilateral amplifier 8 is shifted from its unilateral state to its bilateral state, thereby enabling intercommunication between the local unit 1 and the control center 5 via the wire W3.

Thereafter, when the intercommunication line is disconnected by the control center 5 or when a predetermined time has passed since the start of the intercommunication, the emergency call apparatus 4 opens the telephone line L, and, simultaneously, stops sending the circuit closing signal and the message completion signal. Then, the apparatus 4 stands by until there is another emergency call.

When a person takes an elevator in a multiple dwelling house during the nighttime, the user is generally afraid not only because there might be an elevator accident but also because the elevator might be the scene of a crime. For this reason, some measures must be taken to prevent such crimes. However, with the conventional intercommunication system, in order to intercommunicate with the control center 5, one has to continue depressing the push button of the local unit 1 installed in the car for a period at least equal to the time previously set in the timer 7. In an emergency, one may not be able to intercommunicate with the control center 5 before it is too late. Although the user could intercommunicate with the control center 5, it may be difficult to promptly take some action in an emergency since the elevator car is physically separated from the control center 5. Therefore, no effective prevention of crimes can be expected in the conventional system.

This problem may be overcome by installing in the car a telephone which can be directly connected with the control center 5 or the like so that intercommunication with the control center 5, etc. is possible at any time. However, installing such telephones anew in the existing elevators is not easy from the viewpoint of the installation work required.

SUMMARY OF THE INVENTION

The present invention has been accomplished in order to overcome the above-discussed problems. An object of the present invention is to provide an emergency intercommunication system for an elevator that enables the user of an elevator to intercommunicate with the desired party whenever such is required by the user. Yet another object is to provide an emergency intercommunication system that can be easily installed in the existing elevators.

These and other objects are realized by an emergency intercommunication system for an elevator according to the present invention comprising: a telephone number input apparatus provided in an elevator hall for inputting the desired telephone number; a register for storing the telephone number input through the telephone number input apparatus; an interphone unit and an intercommunication command switch both provided in an elevator car; an intercommunication command detecting section for detecting the actuation of the intercommunication command switch; and an emergency call means for, upon the detection of the actuation of the intercommunication command switch by the intercommunication command detecting means, automatically dialing the telephone number stored in the register to connect the interphone unit with a telephone having the telephone number.

DESCRIPTION OF THE PREFERRED EMBODIMENTS

The preferred embodiments of the present invention will now be described with reference to the drawings.

Figure 1:
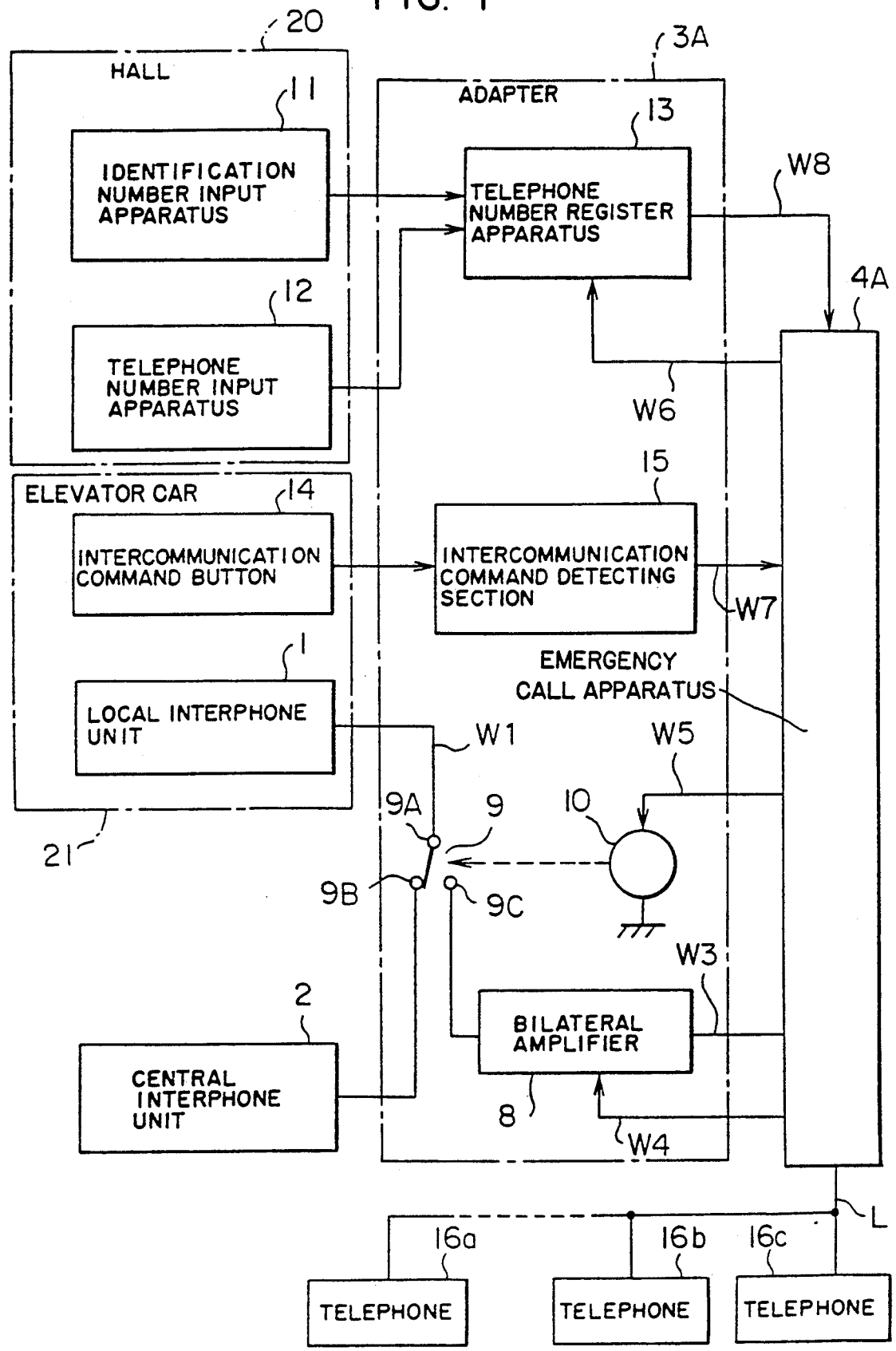
FIG. 1 is a block diagram showing an emergency intercommunication system for an elevator according to one embodiment of the present invention.
Figure 2:
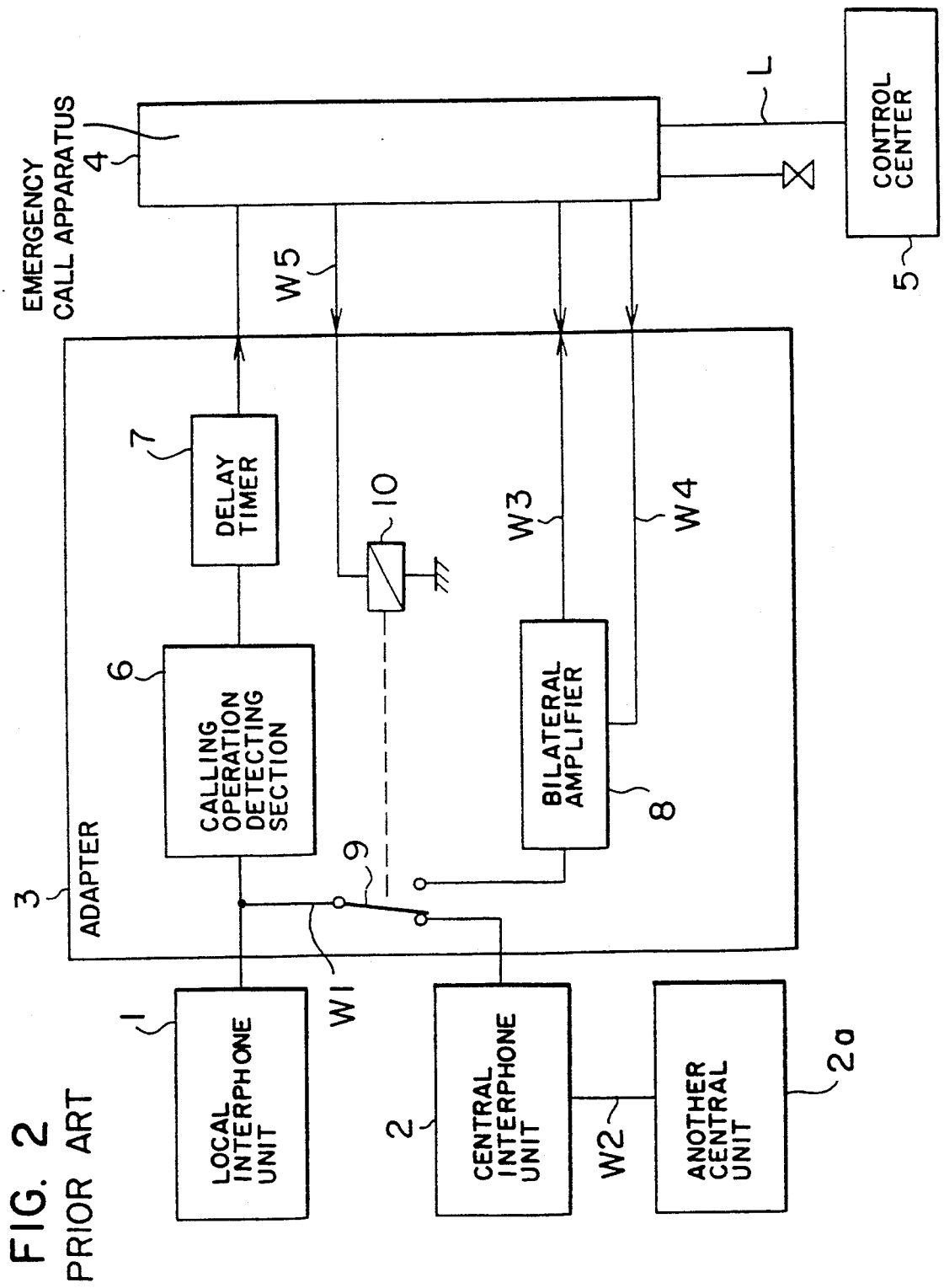
FIG. 2 is a block diagram showing a conventional system.

Referring to FIG. 1, provided in an elevator hall 20 are an identification number input apparatus 11 for inputting an identification number, and a telephone number input apparatus 12 for inputting the telephone number of the desired party. An elevator car 21 is equipped with a local interphone unit 1, and an intercommunication command button 14 which enables intercommunication with a person outside the car 21. A central interphone unit 2 is provided in a control room (not shown), and is connected, via a changeover switch 9 provided in an adapter 3A, with the local unit 1 in the car 21. The local unit 1 is connected with a fixed contact 9A of the switch 9, and the central unit 2 is connected with one movable contact 9B of the switch 9. The other movable contact 9C of the switch 9 is connected with a bilateral amplifier 8.

The identification number input apparatus 11 and the telephone number input apparatus 12, both provided in the hall 20, are connected with a telephone number register apparatus 13 in the adapter 3A. The telephone number register apparatus 13 stores the telephone number inputted through the telephone number input apparatus 12 only when a predetermined identification number has been inputted through the identification number input apparatus 11 The intercommunication command button 14 installed in the car 21 is connected with an intercommunication command detecting section 15 in the adapter 3A which is capable of generating an actuation signal when the button 14 is depressed.

A relay 10 for actuating the changeover switch 9, the bilateral amplifier 8, the telephone number register apparatus 13, and the intercommunication command detecting section 15 is provided in an adapter 3A, which adapter 3A is connected with an emergency call apparatus 4A. The bilateral amplifier 8 is connected with the apparatus 4A via wires W3 and W4, the telephone number register apparatus 13 is connected with the apparatus 4A via wires W6 and W8, the intercommunication command detecting section 15 is connected with the apparatus 4A via a wire W7, and the relay 10 is connected with the apparatus 4A with a wire W5. The emergency call apparatus 4A is in turn connected, via a telephone line L, with telephones 16a to 16c for general use.

When the system is in its normal operation state, the changeover switch 9 is connected to the movable contact 9B, and the bilateral amplifier 8 performs amplification only in the direction heading from the emergency call apparatus 4A to the switch 9.

The operation of this embodiment will be described. During normal operation, since the changeover switch 9 is connected to the movable contact 9B, when a person in the elevator car 21 uses the local interphone unit 1, he can intercommunicate with a person operating the central unit 2 in the control room.

With the system shown in FIG. 1, intercommunication is performed in the following manner when no one is stationed in the control room, for instance, during the nighttime. A person who is to take the elevator car 21 inputs, before he gets in the car 21, a predetermined identification number through the identification number input apparatus 11 provided in the elevator hall 20, and the desired telephone number, such as his home telephone number or a friend's telephone number, through the telephone number input apparatus 12 also provided in the hall 20. This operation causes the input telephone number to be stored in the telephone number register apparatus 13 in the adapter 3A.

Thereafter, the user gets on the car 21. When an emergency has occurred, the user depresses the intercommunication command button 14 provided in the car 21. The intercommunication command detecting section 15 detects the depression of the button 14, and then sends, via the wire W7, an actuation signal to the emergency call apparatus 4A, thereby actuating the apparatus 4A. The actuated emergency call apparatus 4A sends, via the wire W6, a reading command signal to the telephone number register apparatus 13, so as to read, via the wire W8, the telephone number stored in the telephone number register apparatus 13.

When the emergency call apparatus 4A has read the telephone number from the telephone number register apparatus 13, the apparatus 4A operates to automatically dial the telephone 16a, 16b or 16c having the read telephone number, and also operates to send, via the wire W5, a circuit closing signal to the relay 10, whereby the relay 10 is operated to switch the connection at the switch 9 to the movable contact 9C. This switching causes the local interphone unit 1 to be connected, via the bilateral amplifier 8, to the emergency call apparatus 4A. In this state, a dial tone, a ringing tone, etc. transmitted from the apparatus 4A via the wire W3 can be heard.

When the emergency call apparatus 4A is connected with one of the telephones 16a to 16c which the apparatus 4A has automatically dialed, the apparatus 4A sends a previously recorded message to the local interphone unit 1 via the wire W3 and the bilateral amplifier 8. Thereafter, the apparatus 4A sends a message completion signal to the bilateral amplifier 8 via the wire W4. Upon inputting the message completion signal, the bilateral amplifier 8 is shifted from its unilateral state to its bilateral state. This shifting enables intercommunication between the local interphone unit 1 in the car 21 with the desired telephone 16a, 16b or 16c via the wire W3 and the telephone line L.

After the car call has been responded, the emergency call apparatus 4A clears, via the wire W6, the telephone number stored in the telephone number register apparatus 13.

Figure 3:
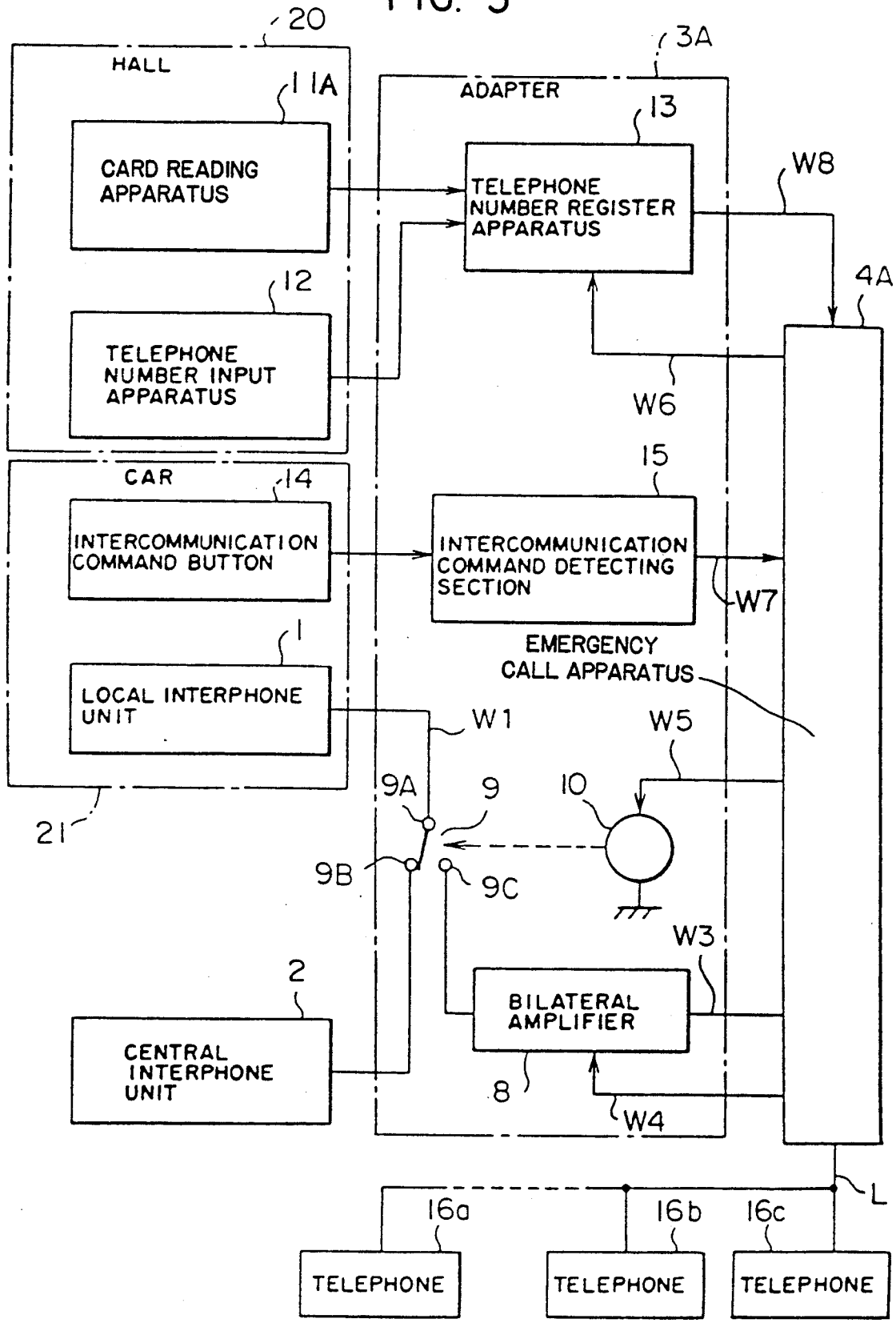
FIG. 3 is a block diagram showing another embodiment of the present invention.

Although in the above-described embodiment the apparatus 11 for inputting an identification number and the apparatus 12 for inputting the desired telephone number are provided in the elevator hall 20, this arrangement may be substituted by another. For instance, the user may carry a magnetic card storing a telephone number, and an apparatus for reading the card 11A may be provided in the elevator hall 20 or the like as depicted in FIG. 3. In this case, the system serves only those who have such magnetic cards.

As described above, according to the present invention, a user facing an emergency can easily and positively intercommunicate with the desired party. The emergency intercommunication system according to the present invention is also advantageous in that it can be installed utilizing interphone and telephone lines, thereby facilitating its installation in the existing elevators.

What is claimed is:

1. An emergency intercommunication system for an elevator comprising:
    a telephone number input means provided in an elevator hall for inputting the desired telephone number;
    a register means for storing the telephone number input through said telephone number input means;
    an interphone unit and an intercommunication command switch both provided in an elevator car;
    an intercommunication command detecting means for detecting the actuation of said intercommunication command switch; and
    an emergency call means for, upon the detection of the actuation of said intercommunication command switch by said intercommunication command detecting means, automatically dialing the telephone number stored in said register means to connect said interphone unit with a telephone having the telephone number.

2. A system according to claim 1, further comprising an adapter for connecting said interphone unit with said emergency call means.

3. A system according to claim 2, wherein said adapter includes said register means and said intercommunication command detecting means.

4. A system according to claim 1, further comprising an identification number input means provided in said elevator hall for inputting an identification number, said register means storing a telephone number only when said telephone number and said identification number have been input from said telephone number input means and said identification number input means, respectively.

5. A system according to claim 4 wherein said telephone number input means is an apparatus for reading a card storing a telephone number, said register means storing the telephone number when said telephone number input means reads the telephone number from the card.

6. An emergency intercommunication system for an elevator comprising:
    means for reading a card containing magnetic information including a telephone number;
    a register for storing the telephone number read by said means for reading a card;
    an intercommunication command detecting apparatus for detecting the actuation of an intercommunication command switch; and
    an emergency call apparatus for dialing the telephone number stored in said register means upon detection of the actuation of the intercommunication command switch by said intercommunication detecting means, thereby connecting said interphone unit with said emergency call means.

* * * * *